US012214820B2

(12) United States Patent
Zehfuss

(10) Patent No.: US 12,214,820 B2
(45) Date of Patent: Feb. 4, 2025

(54) REMOVABLE DOUBLE CHILD SEAT

(71) Applicant: DYNAMIC MOTION, LLC, Richmond, VA (US)

(72) Inventor: Mark Zehfuss, Glen Allen, VA (US)

(73) Assignee: DYNAMIC MOTION, LLC ( * ) Notice: Subject to any disclaimer, the term of this patent is extended or adjusted under 35 U.S.C. 154(b) by 99 days.

(21) Appl. No.: 17/743,094

(22) Filed: May 12, 2022

(65) Prior Publication Data

US 2022/0410960 A1 Dec. 29, 2022

Related U.S. Application Data

(60) Provisional application No. 63/187,460, filed on May 12, 2021.

(51) Int. Cl.
B62B 9/24 (2006.01)
B62B 7/14 (2006.01)

(52) U.S. Cl.
CPC ............... B62B 7/145 (2013.01); B62B 9/24 (2013.01)

(58) Field of Classification Search
CPC .......... B62B 7/145; B62B 7/008; B62B 9/24; B62B 9/102
See application file for complete search history.

(56) References Cited

U.S. PATENT DOCUMENTS

| | | | | |
|---|---|---|---|---|
| 8,955,855 | B2* | 2/2015 | Herlitz | B62B 9/108 |
| | | | | 280/47.38 |
| 9,630,531 | B1* | 4/2017 | Privatera | B60N 2/2881 |
| 10,351,153 | B2* | 7/2019 | Lopez | B62B 3/1444 |
| 11,014,526 | B1* | 5/2021 | Morgan | B60R 22/105 |
| 11,396,317 | B2* | 7/2022 | Eisele | B62B 5/082 |
| 12,037,037 | B2* | 7/2024 | Zehfuss | B62B 3/007 |
| 2021/0038929 | A1* | 2/2021 | Vitt | A62B 35/0031 |

FOREIGN PATENT DOCUMENTS

CA 2246082 A1 * 3/2000 ............. B62B 13/18

OTHER PUBLICATIONS

WonderFold Wagon Premium Seats; WonderFold Wagon; Apr. 21, 2021; https://www.youtube.com/watch?v=WY4GMTYr3Wc&t=51s (Year: 2021).*

* cited by examiner

Primary Examiner — Steve Clemmons
(74) Attorney, Agent, or Firm — Bernard G. Pike, Pike IP law

(57) ABSTRACT

Strollers, wagons and other child carrying devices will typically comprise one or more child seats for transporting a child or children. Each child seat may comprise a child restraint harness system to retain the child safely in the child seat for transporting. Most child seat may accommodate only one child but may have sufficient space to accommodate two children but are not equipped with enough seat belts or other proper restraints. A removable double child seat may be removably attached to the single child seat to convert the single child seat into a double child seat with an appropriate harness system to retain both children safely.

3 Claims, 3 Drawing Sheets

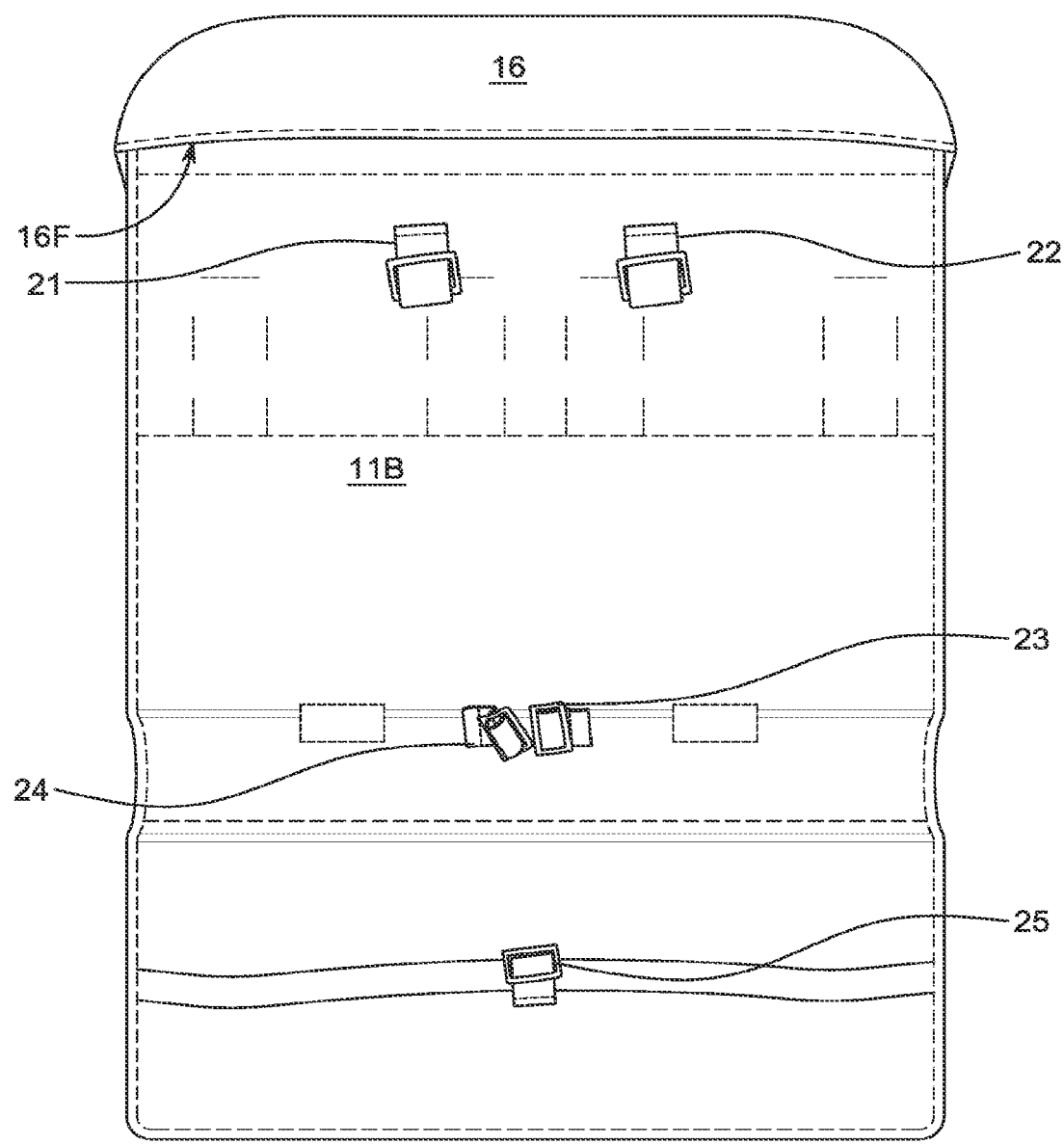
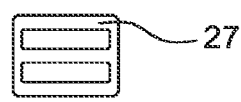
FIG. 2
FIG. 3
FIG. 4

REMOVABLE DOUBLE CHILD SEAT

FIELD OF THE INVENTION

Strollers, wagons and other child carrying devices will typically comprise one or more child seats for transporting a child or children. Each child seat may comprise a child restraint harness system to retain the child safely in the child seat for transporting. Most child seats may accommodate only one child but may have sufficient space to accommodate two children but are not equipped with enough seat belts or other proper restraints. A removable double child seat may be removably attached to the single child seat to convert the single child seat into a double child seat with an appropriate harness system to retain both children safely.

BACKGROUND

Parents and other child guardians transport children in strollers, wagons, and other wheeled child carrying devices. Strollers and wagons, for example, have at least one fixed seat (a fixed seat may be removable but is connected to the stroller frame.) that includes a child restraint harness to restrict the child's movement during use and to provide safety for the child in the event of an accident.

Typically, the fixed seats are fabric covered but may also be formed directly from plastic. The child restraint harness may be permanently attached to the permanently attached to the seat or removably attached to the fixed seat.

There is a need for a device and method of converting a wagon or stroller seat from having a single child harness to having a double child harness for retaining two children side by side in a wagon, stroller or other wheeled child carrying device.

SUMMARY

A typical wagon, stroller, or other wheeled child carrying device may comprise at least one fixed seat comprising a child restraint harness for securing a child in the fixed seat. The child restraint harness may be removably connected to the fixed seat. In embodiments with a removable child restraint harness, the fixed seat may have removable fixed seat connectors for attaching the child restraint harness.

Embodiments of a removable child seat cover to convert a single child seat, such as a fixed child seat, into a double child seat for a wheeled child carrying device. The removable child seat cover may be attached over the fixed child seat to convert the single child seat into the double child seat. In an embodiment, the removable child seat cover may comprise a seat backing having a front side and a back side with two child restraint harnesses attached to the front side of the removable seat backing. The removable child seat cover may further comprise a releasable connection system on the back side of the removable seat backing to connect the removable seat backing to a fixed seat of a wagon, stroller or other wheeled child carrying device.

The fixed seat may comprise fixed seat connectors that connect the child restraint harness to the fixed seat. The child restraint harness may be a five point child restraint harness, for example. The removable child seat cover may comprise a connection system to attach the removable child seat cover to the fixed seat. In some embodiments, the child restraint harness and the child seat cover comprise connectors complementary to the fixed seat connectors for connecting each to the fixed seat. In such an embodiment, a releasable connection system on the back side of the removable seat backing connects the removable seat backing to the fixed seat of the wheeled child carrying device.

In some embodiments, the child restraint harness connection system comprises apertures or slots defined in the seat back or the seat bottom of the fixed seat and straps comprising swiveling tabs connected to the backside of the removable seat backing. The child restraint harness may also comprise swiveling tabs to connect the child restraint system to the fixed child seat. In either attachment, the straps may extend through the slots or apertures in the seat back or the seat bottom of the fixed seat and are retained through the apertures by the swiveling locking tabs.

In addition to the removable connectors, the removable child seat cover may also comprise a panel attached to the back side of the removable seat backing, wherein the panel defines a pocket between the back side and the panel. The panel may be located on a top portion of the child seat cover to define a pocket for receiving a corresponding top portion of the fixed seat.

The removable double child seat of claim 1, wherein the removable seat back comprises a backrest portion and a seat bottom portion and the fixed seat has complementary backrest portion and seat bottom portion.

Embodiments further comprise a wheeled baby carrying device comprising a fixed seat having a single child restraint harness and a removable double child seat having two child restraint harnesses that may be removably connected to the fixed seat to convert the fixed seat to a double seat. Such an embodiment of a wheeled baby carrying device may comprise a fixed seat comprising at least three fixed seat connectors for connecting a removable child restraint harness to the fixed seat and a removable double child seat comprising a seat back having a front side and a back side, two child restraint harnesses connected to the front side, and at least three seat back removable connectors connected to the back side of the seat back.

The fixed seat connectors comprise at least one slot or aperture defined by fixed seat to allow a component of the seat back removable connectors to be threaded through the slot or aperture to secure the removable seat cover to the fixed seat. For instance, the removable child restraint harness may comprise swivel tabs and a strap and the swivel tabs are threaded through the slots or apertures to connect the removable child restraint harness to the fixed seat. Similarly, the seat back removable connectors may be threaded through the slots or apertures to connect the removable double child seat to the fixed seat in embodiments where the seat back removable connectors comprise a strap and a swivel tab.

BRIEF DESCRIPTION OF THE DRAWINGS

FIG. 2 depicts the back side of the embodiment of the removable child seat cover shown in FIG. 1, in the depicted embodiment fixed seat connectors are connected to the backside of the removable child seat cover, the fixed seat connectors of the depicted embodiment have corresponding connectors on the fixed seat;

FIG. 3 depicts a swiveling tab of an embodiment of the fixed seat connector that may be inserted through an aperture defined in the fixed seat of a stroller, wagon, or other wheeled child carrying device to attach the removable child seat cover to the fixed seat, the removable child seat cover may comprise a plurality of fixed seat connectors;

FIG. 4 depicts a looped strap of a fixed seat connector for connecting the swiveling connector to the back side of the embodiment of the removable child seat cover and to insert through a slot defined in the fixed seat.

DESCRIPTION OF THE INVENTION

Figure 1:
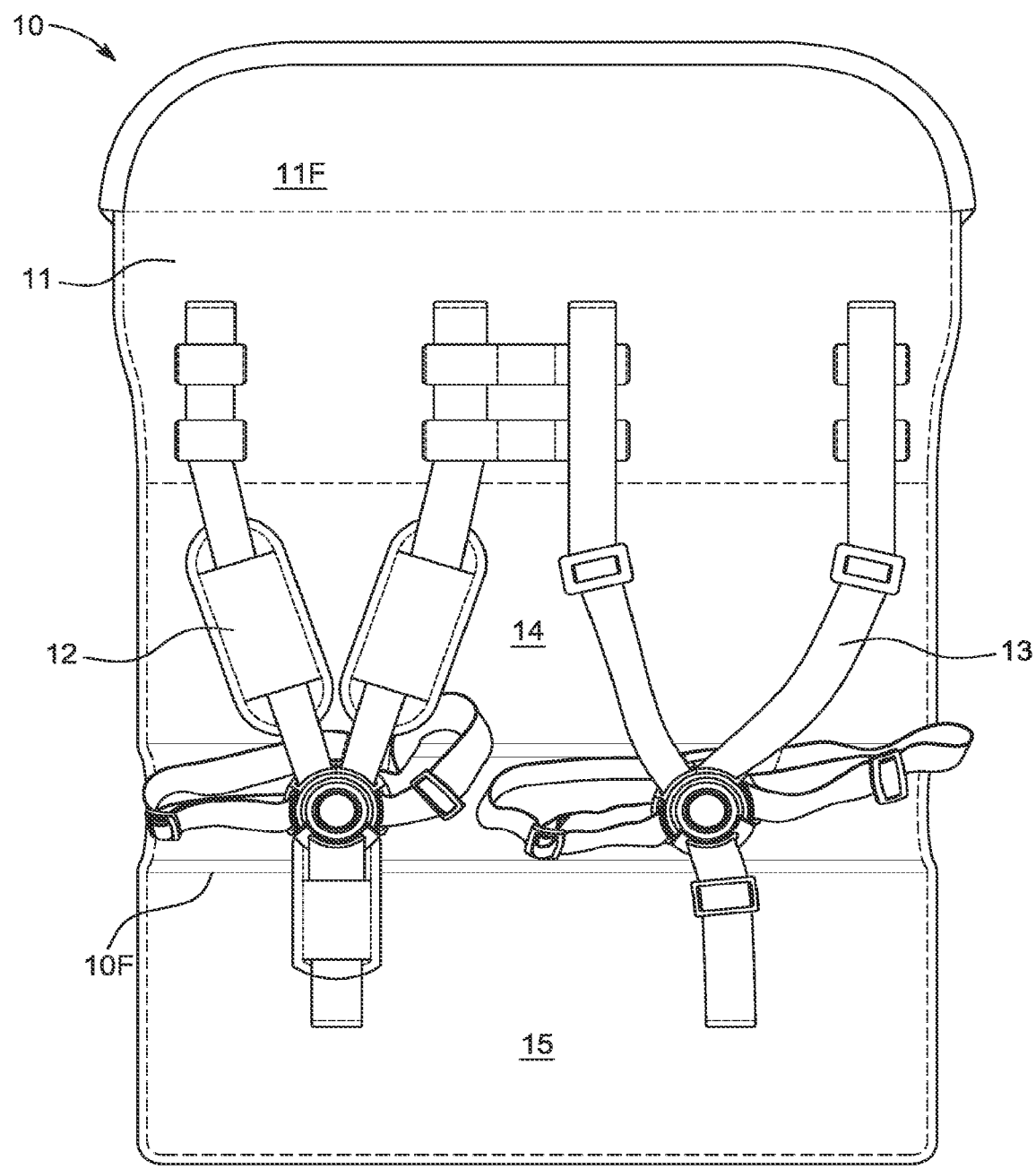
FIG. 1 depicts the front side of an embodiment of a removable child seat cover for converting a single fixed seat into a double seat, comprising two child restraint harnesses on a front side of the removable child seat.

Parents and guardians can safely transport children in wagons, strollers, and other wheeled child carrying devices. Such devices may require child restraint harnesses that comply with governmental regulations to keep the children safe during transportation. Such devices are typically designed to hold one child in a seat fixed to the wagon, stroller, or other wheeled child carrying device. This limits the number of children and other articles that the wagon, stroller or other wheeled child carrying device can safely accommodate. This limitation may inconvenience the parent or guardian when they must transport more children than the wagon, stroller or other child carrying device was originally designed to carry or to have the children sit in a side by side manner in the child carrying device.

A five-point harness has five attachment points to the child seat designed to restrain a child at the shoulders and hips, which are the most rigid parts of their body. If there is a crash, the car seat harness transfers the forces of the crash to these rigid points of the body and into the seat. A removable five-point harness will typically have five connection points with the fixed seat of the wheeled child carrying device. In some instances, the five connection points may comprise apertures or slots in the fixed seat and a connector that extends through the aperture or slot. A protrusion, tab, swiveling tab, or other device may be connected to the strap that allows the harness to remain securely attached to the fixed seat during use but may be removed with simple manipulation. As used herein, removable means that the component may be removed from the device that it is attached to with manual manipulation with human hands.

For example, many child carrying wagons are designed to have child seats with child restraint harnesses on either end of the wagon so the children seat face to face. Typically, the children are only capable of sitting facing each other in opposing seats even though a typical child carrying wagon has a sufficient carrying capacity to carry three or four children. However, the wagons do not have a sufficient number of child restraint harnesses to safely carry this number of children.

To solve this issue, embodiments of a removable child seat cover comprise two child restraint harnesses and connectors for connecting the removable child seat cover. The removable child seat cover comprising two child restraint harnesses may be attached over a single seat of a wagon, stroller or other wheeled child carrying device, for example. Such an embodiment of the removable child seat cover may be attached to a child seat having a single child restraint harness to convert the single child seat into a double child seat with two child restraint harnesses. Attaching one such removable child seat cover to the wagon will allow the wagon to safely transport three children and attaching two removable child seat covers to both fixed seats of a wagon can allow the wagon to safely transport four children. Alternatively, the parent or guardian could attach such an embodiment of the removable child seat cover to one end of the wagon to allow the children to sit side by side. The other end of the wagon may be left empty or used to transport a third child, packages, picnic items, a pet, or other articles.

An embodiment of the removable child seat cover is configured to convert a single child seat into a double child seat for a wheeled child carrying device. In another embodiment, the removable child seat cover is configured to convert a double child seat into a single child seat for a wheeled child carrying device that has a fixed seat comprising two child restraint harnesses. In such an embodiment, the removable child seat cover comprises only one child seat harness.

Embodiments of the removable child seat cover comprises an attachment system for removably attaching the removable child seat cover to a fixed seat of the wheeled child carrying device. One side, the front side, of the removable child seat cover comprises at least one child restraint harness to safely secure at least one child in the wagon, stroller, or other wheeled child carrying device.

An embodiment of the removable child seat cover to convert a single child seat into a double child seat for a wheeled child carrying device is shown in FIG. 1. The removable child seat cover 10 comprises a removable seat backing 11 having a front side 11F and a back side 11B. The front side 11F has two child restraint harnesses 12 and 13 attached to it. The child harnesses may be permanently connected or removably connected to the removable seat backing. The child restraint harnesses 12 and 13 may be adjustable for different size or age of a child, as shown and know in the art.

In embodiments of the removable child seat cover, the back side 11B of the seat backing 11 may have a releasable connection system to removably connect the removable child seat cover 10 to a fixed seat 100 (See FIG. 5) of a wheeled child carrying device. In the shown embodiment of the releasable connections system of FIG. 2, the back side 11B of the seat backing 11 comprises five connectors 21, 22, 23, 24 and 25. Each of the five connectors 21, 22, 23, 24 and 25 comprise a looped strap 26 and a swiveling connector 27. In this embodiment, the swiveling connector 27 is a three bar buckle shape and the looped strap 26 encircles the middle bar. Other connectors as known in the art may be used to connect the removable seat cover to the fixed seat of the wheeled child carrying device.

Since the looped strap 26 encircles the middle bar of the swiveling connector, the swiveling connector 27 may be rotated within the looped connector 26 to facilitate inserting the swiveling connector 27 through an aperture or slot defined in the fixed seat or the cover of the fixed seat.

Figure 5:
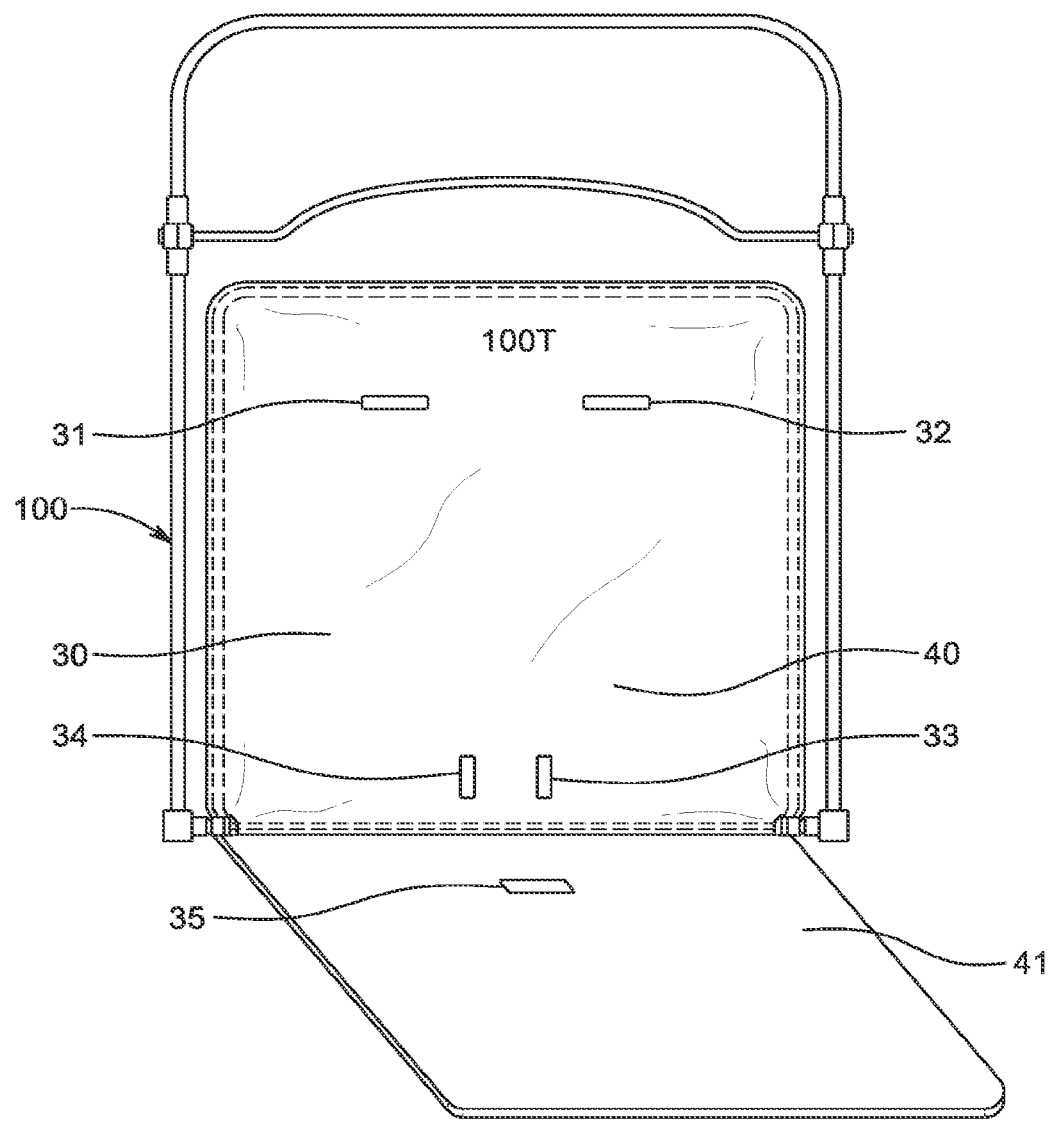
FIG. 5 depicts a fixed seat for a wagon, a stroller of other wheeled child seat that comprises a fabric cover, wherein the fabric cover of the fixed seat defines apertures that may be used to either attach a single child restraint harness or to attach the embodiment of the removable child seat cover shown in FIGS. 1 and 2.

A complementary fixed seat is shown in FIG. 5. The fixed seat 100 has a seat back 30 and a seat bottom 41 that define apertures 31, 32, 33, 34, and 35. The apertures 31, 32, 33, 34, and 35 provide a connection system for both a single child restraint harness and the seat backing 11. In this embodiment, the single harness (not shown) is connected to the fixed seat 100 by threading the harness straps through the apertures 31, 32, 33, 34, and 35. With the harness removed, the apertures 31, 32, 33, 34, and 35 are empty and the swiveling connectors 27 may be rotated to a position substantially perpendicular to the fixed seat back rest 40 or the fixed seat bottom 41 and threaded through the apertures 31, 32, 33, 34, and 35 and then the swiveling connector 27 may be rotated to retain the removable seat back cover attached to the fixed seat.

After connection, the fixed seat will have two child restraint harnesses attached to safely retain two children in a fixed seat originally limited to safely harnessing only one child.

In other embodiments, the fixed seat may have a different child restraint harness connection system and the releasable connection system on the back side of the removable seat backing is complementary to this connection system. The connection system may be tailored to the fixed seat to provide a connection between the removable seat backing and the fixed seat and thus to the wheeled child carrying device.

The removable child seat shown embodiment shown in FIGS. 1 and 2 has the child restraint harness connection system capable of being connected to the apertures defined in the seat back of the fixed seat and straps comprising swiveling locking tabs connected to the backside of the removable seat backing. Other connection systems may be used in embodiments of the removable seat back cover including, but not limited to, hook and loop connectors, buttons and buttonholes, snaps, laces, rods and pockets, elastic bands, a pocket that receives at least a portion of the fixed seat or other component of the wheeled child carrying device, other connection means, or combinations thereof, for example.

In this shown embodiment, the straps 26 are connected to the removable seat cover and extend through the apertures 31, 32, 33, 34, and 35 in the fixed seat back 40 and the fixed seat bottom 41 of the fixed seat and are retained through the apertures 31, 32, 33, 34, and 35 by the swiveling locking tabs 27.

A shown, the removable child seat cover 10 comprising a panel 16 attached to the top back side 11B of the removable seat backing 11, wherein the panel 16 defines a pocket 16F between the back side 11B and the panel 16. The panel 16 may be stitched around three sides to form the pocket, for example. In the embodiment shown, the pocket 16B receives the top portion 100T of the fixed seat 100. This pocket 16F further secures the removable seat back cover 10 to the fixed seat 100 in combination with the connection system.

The removable double child seat shown in FIG. 1. comprises a seat back portion 14 and a seat bottom portion 15. The removable child seat cover comprises a folding seam 10F between the seat back portion 14 and a seat bottom portion 15 that allows the seat back 11 to be folded to conform to the fixed seat.

The wheeled child carrying device may be one of a wagon or a stroller with a fixed seat comprising a single child restraint harness.

The invention claimed is:

1. A wheeled baby carrying device, comprising:
   a fixed seat defining at least three fixed seat connector apertures extending through the fixed seat for connecting a removable first child restraint harness to the fixed seat; and
   a removable double child seat comprising a seat back having a front side and a back side, a second child restraint harness and a third child restraint harness connected to the front side, and at least three seat back removable connectors connected to the back side, wherein the seat back removable connectors compromise a looped strap and a swivel tab, each of the swivel abs are threaded through the corresponding fixed seat connector apertures defined in the fixed seat to secure the removable double child seat to the fixed seat.

2. The wheeled baby carrying device of claim 1, wherein the removable first child restraint harness comprises separate portions and the separate portions are threaded through the fixed seat connector apertures to connect the removable first child restraint harness to the fixed seat.

3. The wheeled baby carrying device of claim 1, further comprising a removable first child restraint harness harness having harness connectors for threading through the fixed seat connector apertures for connecting to the fixed seat.

* * * * *